(12) United States Patent
Yangpichit

(10) Patent No.: US 7,854,224 B2
(45) Date of Patent: *Dec. 21, 2010

(54) SOLAR CHIMNEY WITH INTERNAL AND EXTERNAL SOLAR COLLECTORS

(76) Inventor: Pitaya Yangpichit, 191 Suriwong Road, Bangkok (TH) 10500

( * ) Notice: Subject to any disclaimer, the term of this patent is extended or adjusted under 35 U.S.C. 154(b) by 1023 days.

This patent is subject to a terminal disclaimer.

(21) Appl. No.: 11/619,289

(22) Filed: Jan. 3, 2007

(65) Prior Publication Data

US 2008/0156318 A1 Jul. 3, 2008

(51) Int. Cl.
*F24J 2/42* (2006.01)
(52) U.S. Cl. .................. 126/683; 126/569; 126/680; 126/684; 126/699; 126/698; 126/648; 290/55; 60/641.8; 60/641.12
(58) Field of Classification Search ............. 126/569, 126/617, 621, 640, 643, 648, 698, 69, 700, 126/704, 684, 680, 714, 683, 699; 290/55; 60/641.12, 641.8; 136/208.1

See application file for complete search history.

(56) References Cited

U.S. PATENT DOCUMENTS

| | | | | | |
|---|---|---|---|---|---|
| 606,677 | A | * | 7/1898 | Morrison | 285/210 |
| 1,081,098 | A | * | 12/1913 | De La Garza | 126/607 |
| 2,902,028 | A | * | 9/1959 | Manly | 202/267.1 |
| 3,869,199 | A | * | 3/1975 | Cummings | 126/651 |
| 3,979,597 | A | | 9/1976 | Drucker | |
| 4,018,212 | A | * | 4/1977 | Hein et al. | 126/681 |
| 4,026,273 | A | | 5/1977 | Parker | |
| 4,096,698 | A | | 6/1978 | Martin | |
| 4,137,899 | A | * | 2/1979 | Weslow | 126/649 |
| 4,151,829 | A | * | 5/1979 | Wilson | 126/683 |
| 4,188,941 | A | * | 2/1980 | Hopkins | 126/646 |
| 4,275,309 | A | | 6/1981 | Lucier | |
| 4,286,581 | A | * | 9/1981 | Atkinson, Jr. | 126/585 |
| 4,307,711 | A | * | 12/1981 | Doundoulakis | 126/677 |
| 4,331,042 | A | | 5/1982 | Anderson | |
| 4,388,533 | A | | 6/1983 | Campbell | |

(Continued)

FOREIGN PATENT DOCUMENTS

DE 2521588 A1 12/1976

(Continued)

OTHER PUBLICATIONS

U.S. Department of Energy, "CSP Technologies Overview", www.energylan.sandia.gov/sunlab/overview.htm (7 pages).

(Continued)

*Primary Examiner*—Carl D Price
(74) *Attorney, Agent, or Firm*—William H. Eilberg

(57) ABSTRACT

A solar chimney includes a solar collector which heats air in the chimney, producing updrafts which can be harnessed to perform useful work. The solar collector may be located inside or outside the chimney. The device may include a reservoir for storing a heat transfer fluid, thus enabling the device to be used during both day and night. The solar chimney may be equipped with both internal and external solar collectors, operating in parallel. The solar chimney may also be equipped with multiple external solar collectors, connected in parallel to a reservoir. The solar chimney of the invention provides a convenient and practical way to convert solar energy into electrical power.

6 Claims, 18 Drawing Sheets

U.S. PATENT DOCUMENTS

| | | | |
|---|---|---|---|
| 4,421,159 | A | 12/1983 | Lin |
| 4,433,544 | A | 2/1984 | Wells |
| 4,434,787 | A | 3/1984 | Young |
| 4,453,383 | A | 6/1984 | Collins |
| 4,706,471 | A | 11/1987 | Alexander |
| 4,830,677 | A | 5/1989 | Geisler |
| 5,381,048 | A | 1/1995 | Baird |
| 6,016,015 | A | 1/2000 | Willard |
| 6,089,021 | A | 7/2000 | Senanayake |
| 6,384,320 | B1 * | 5/2002 | Chen ............... 136/259 |
| 6,772,593 | B2 | 8/2004 | Dunn |
| 7,026,723 | B2 | 4/2006 | Moreno |
| 2008/0314058 | A1 * | 12/2008 | Jones et al. ............ 62/235.1 |

FOREIGN PATENT DOCUMENTS

| | | | |
|---|---|---|---|
| DE | 3312977 | A1 * | 10/1984 |
| DE | 19821659 | A1 * | 11/1999 |
| DE | 10023424 | A1 | 11/2001 |
| DE | 10343544 | A1 | 4/2005 |
| EP | 0017105 | A1 | 10/1980 |
| EP | 1589221 | A2 | 10/2005 |
| EP | 1741927 | A1 | 1/2007 |
| EP | 1830061 | A2 | 9/2007 |
| FR | 2363711 | A1 | 3/1978 |
| FR | 2574863 | A1 * | 6/1986 |
| FR | 2683864 | A1 * | 5/1993 |
| FR | 2725501 | A3 * | 4/1996 |
| FR | 2844561 | A1 | 9/2002 |
| FR | 2848616 | A1 * | 6/2004 |
| GB | 1549452 | A | 8/1979 |
| GB | 2062107 | A * | 5/1981 |
| GB | 2089024 | A * | 6/1982 |
| GB | 2182076 | A * | 5/1987 |
| JP | 57005570 | A * | 1/1982 |
| JP | 57035999 | A * | 2/1982 |
| JP | 57169550 | A | 10/1982 |
| JP | 2004100496 | A * | 4/2004 |
| WO | WO 2004036039 | A1 * | 4/2004 |
| WO | WO 2004085846 | A1 * | 10/2004 |
| WO | WO 2005045245 | A1 * | 5/2005 |
| WO | WO 2005100878 | A1 * | 10/2005 |
| WO | 2005/103581 | A1 | 11/2005 |
| WO | 2006/098662 | A2 | 9/2006 |

OTHER PUBLICATIONS

Schlaich et al, "Solar Chimneys", Encyclopedia of Physical Science and Technology, 3rd ed. 2000 (11 pages).

U.S. Department of Energy, "Solar Power Tower", www.energylan.sandia.gov/sunlab/PDFs/solar_tower.pdf (pp. 5-6 through 5-23).

U.S. Department of Energy, "Solar Parabolic Trough", www.energylan.sandia.gov/sunlab/PDFs/solar_trough.pdf (pp. 5-24 through 5-44).

* cited by examiner

Top View

Side View

Top View

Side View — 43

— 45

External Solar Thermal collector with solid thermal conductor.

Chimney

Solar Thermal Collector

External Solar Thermal collector with solid thermal conductor.

Chimney

Solar Thermal Collector

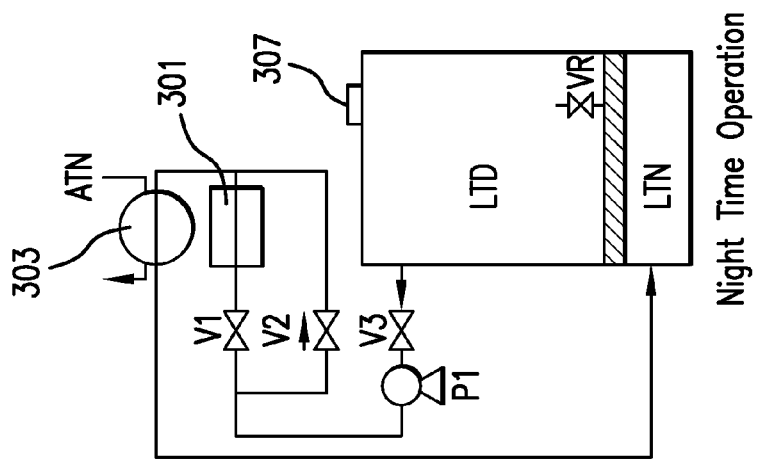
FIG. 15C Night Time Operation
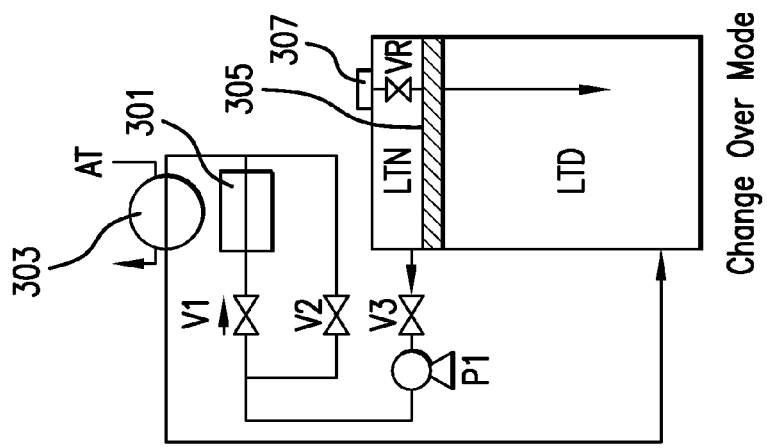
FIG. 15B Change Over Mode
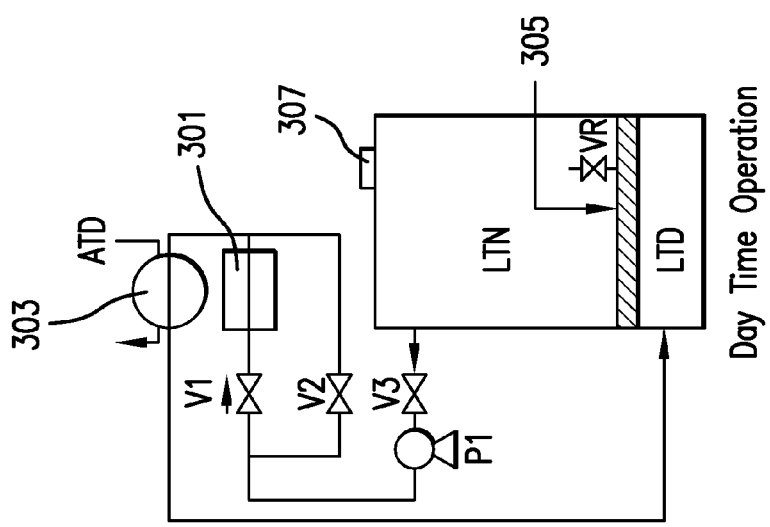
FIG. 15A Day Time Operation

SOLAR CHIMNEY WITH INTERNAL AND EXTERNAL SOLAR COLLECTORS

BACKGROUND OF THE INVENTION

This invention relates to the production of electric power, or other useful work, from solar energy.

In a solar chimney, energy from the sun heats the air in an elongated, enclosed vertical structure, so as to create an updraft in the structure. The moving air can then be used to drive a turbine to produce electric power, or it can be made to perform other useful work. A solar chimney has the advantage that it does not depend on the presence of wind, but requires only sunlight as the source of energy.

Examples of solar chimneys, as shown in the prior art, are given in U.S. Pat. Nos. 3,979,597, 4,275,309, 4,331,042, 4,433,544, 5,381,048, 6,016,015, 6,089,021, 6,772,593, and 7,026,723, the disclosures of which are incorporated by reference herein.

The present invention provides improvements over the solar chimneys of the prior art. The solar chimney of the present invention concentrates incident solar radiation into a high-intensity beam which can be directed or focused onto a collector. In one embodiment, the system of the present invention can be used to generate power even during nighttime.

SUMMARY OF THE INVENTION

In a first embodiment, the solar chimney of the present invention comprises a solar collector located within the chimney. Solar radiation from outside the chimney is concentrated by a reflector, or its equivalent, and passes through an aperture in the chimney wall. The aperture may include a lens, or the lens may be omitted. The concentrated solar radiation impinges on a collector which distributes absorbed heat to a heat exchanger, also located within the chimney. Air in the chimney is heated by convection, due to the temperature difference between the heat exchanger and the surrounding air. The heating of the air produces an updraft in the chimney. The updraft comprises a stream of moving air which can be used to perform useful work.

The heat exchanger could be a fixed structure, or it could comprise a plurality of vanes which rotate relative to the chimney, either under the power of a motor, or by free rotation under the influence of the updrafts in the chimney.

In another embodiment, the solar collector is located outside the chimney, while the heat exchanger is located inside the chimney. Heat absorbed by the collector is conveyed to the heat exchanger, either with a solid heat conductor, or by a heat transfer fluid.

In another embodiment, the solar chimney includes a reservoir having two or more compartments, the system being usable during both day and night. During the day, heat transfer fluid is pumped from the reservoir, and into a solar collector, where the fluid absorbs heat from solar radiation. The heated fluid is then conveyed into a heat exchanger located within a chimney. The fluid, which has given up some of its heat to the heat exchanger, but which is still relatively hot, is returned to the reservoir, and is stored in a different compartment from the one from which the fluid was initially withdrawn. During the night, heat transfer fluid is conveyed directly from the reservoir into the heat exchanger in the chimney. Thus, an updraft in the chimney can be produced even during the night. The compartments of the reservoir are defined by one or more movable partitions which provide mechanical and thermal separation between compartments.

In another embodiment, the solar chimney may include both an internal solar collector, located inside the chimney, and an external solar collector, located outside the chimney and connected to transfer heat to a heat exchanger within the chimney. Both the internal collector and the external collector operate in tandem.

In still another embodiment, the solar chimney comprises multiple external solar collectors, the solar collectors providing heat to the fluids in a multiple-compartment reservoir, the system being usable during both day and night.

The present invention therefore has the primary object of providing a solar chimney, in which solar energy heats air in the chimney, causing updrafts which can be harnessed to perform useful work.

The invention has the further object of providing a solar chimney in which the solar collector and heat exchanger are located within the chimney.

The invention has the further object of providing a solar chimney in which a solar collector, external to the chimney, provides heat to a heat exchanger located within the chimney.

The invention has the further object of providing a solar chimney which is capable of operation during both day and night.

The invention has the further object of providing a solar chimney having both internal and external solar collectors.

The invention has the further object of providing a solar chimney having multiple external solar collectors, the collectors being connected in parallel to feed a reservoir, the solar chimney being usable during both day and night.

The invention has the further object of improving the efficiency of a solar chimney.

The invention has the further object of providing an improved device for harnessing the energy of the sun to do useful work.

The reader skilled in the art will recognize other objects and advantages of the present invention, from a reading of the following brief description of the drawings, the detailed description of the invention, and the appended claims.

BRIEF DESCRIPTION OF THE DRAWINGS

FIGS. 15A, 15B, and 15C provide schematic diagrams illustrating the operation of the system of FIG. 14 in daytime and nighttime, and showing the change-over from one mode to the other.

DETAILED DESCRIPTION OF THE INVENTION

Figure 1:
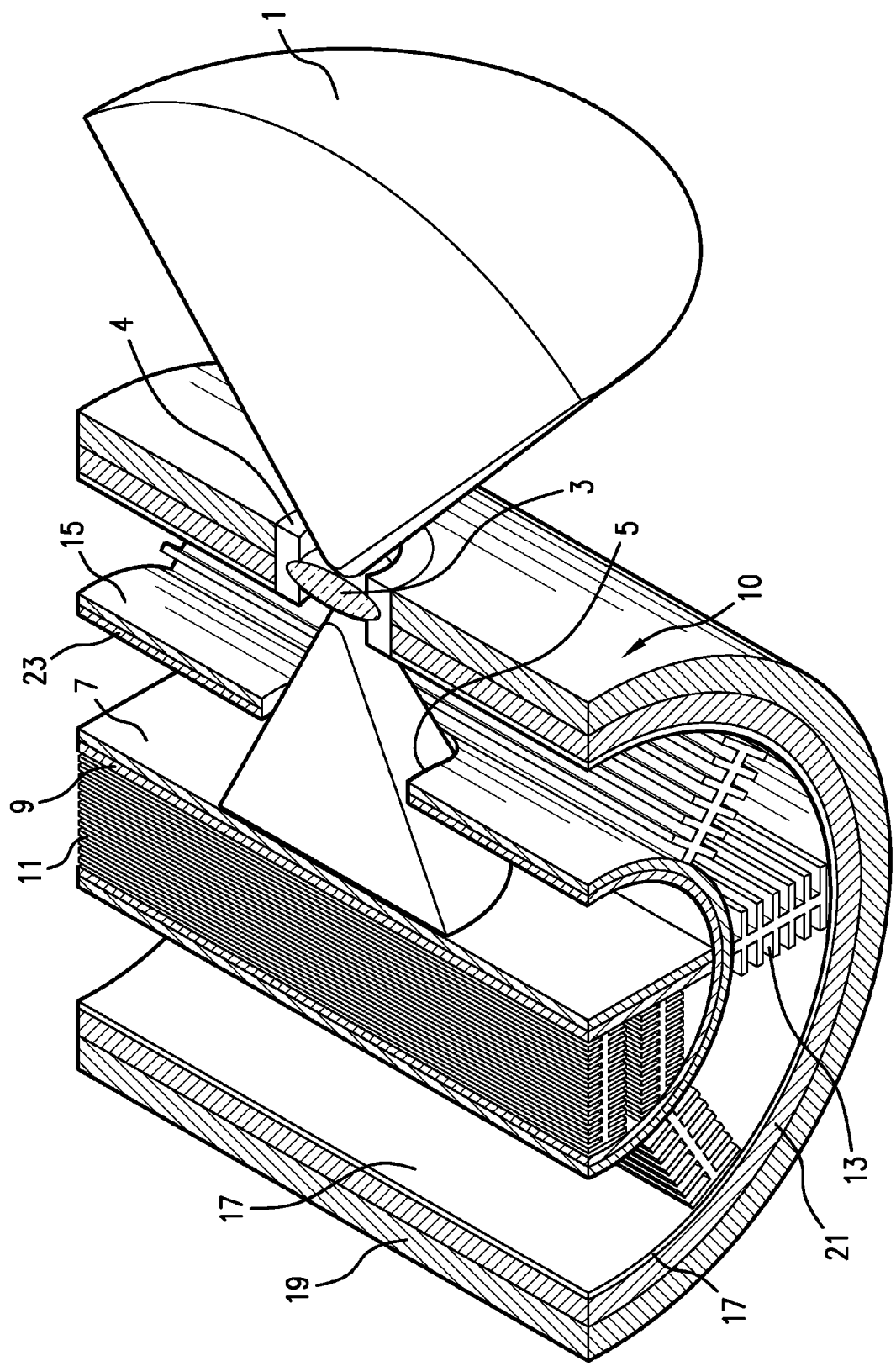
FIG. 1 provides a cut-away perspective view of a combined solar collector and heat exchanger, together with means for concentrating solar energy, made according to the present invention.
Figure 2:
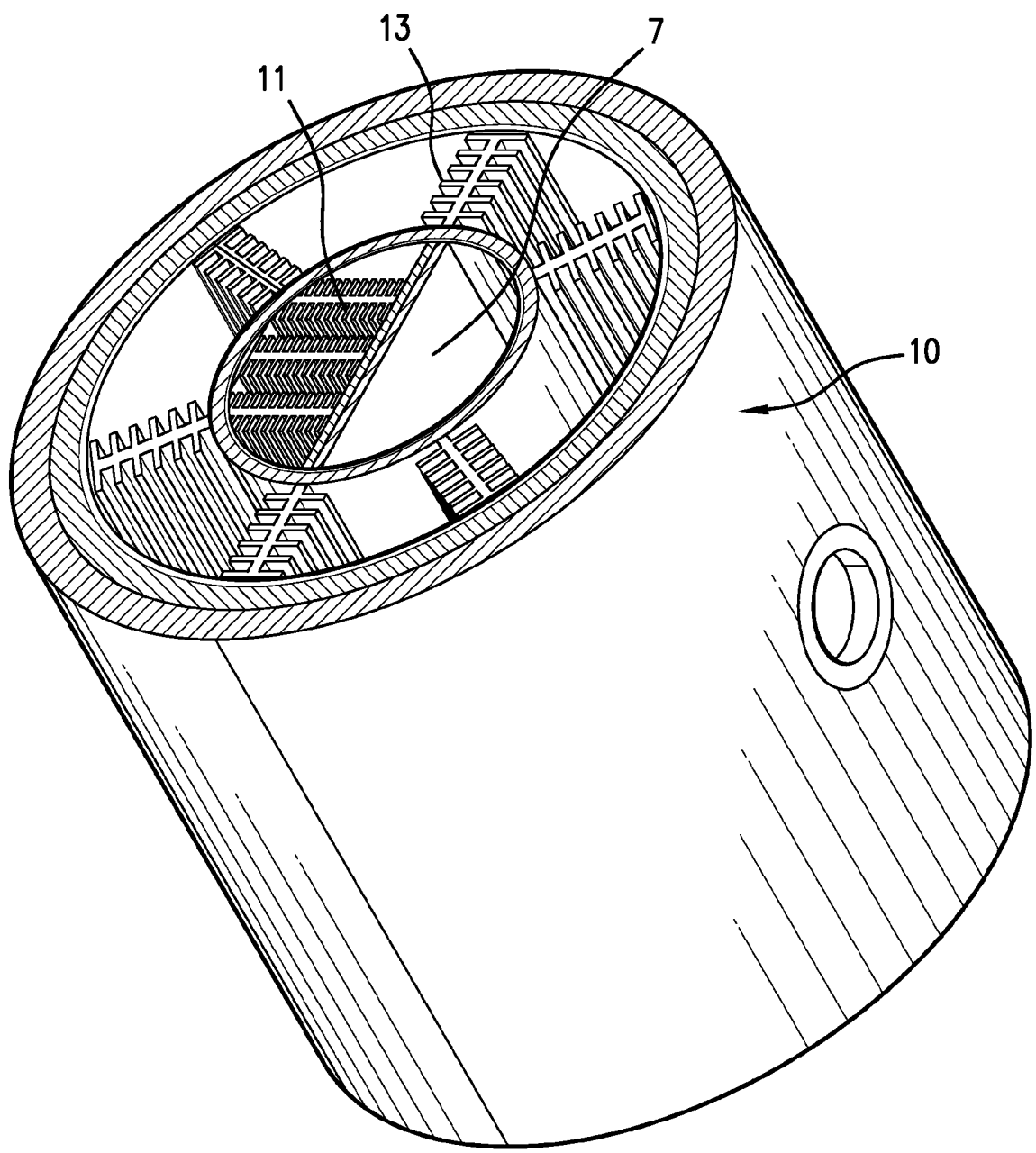
FIG. 2 provides another perspective view of the combined solar collector and heat exchanger of FIG. 1.
Figure 3:
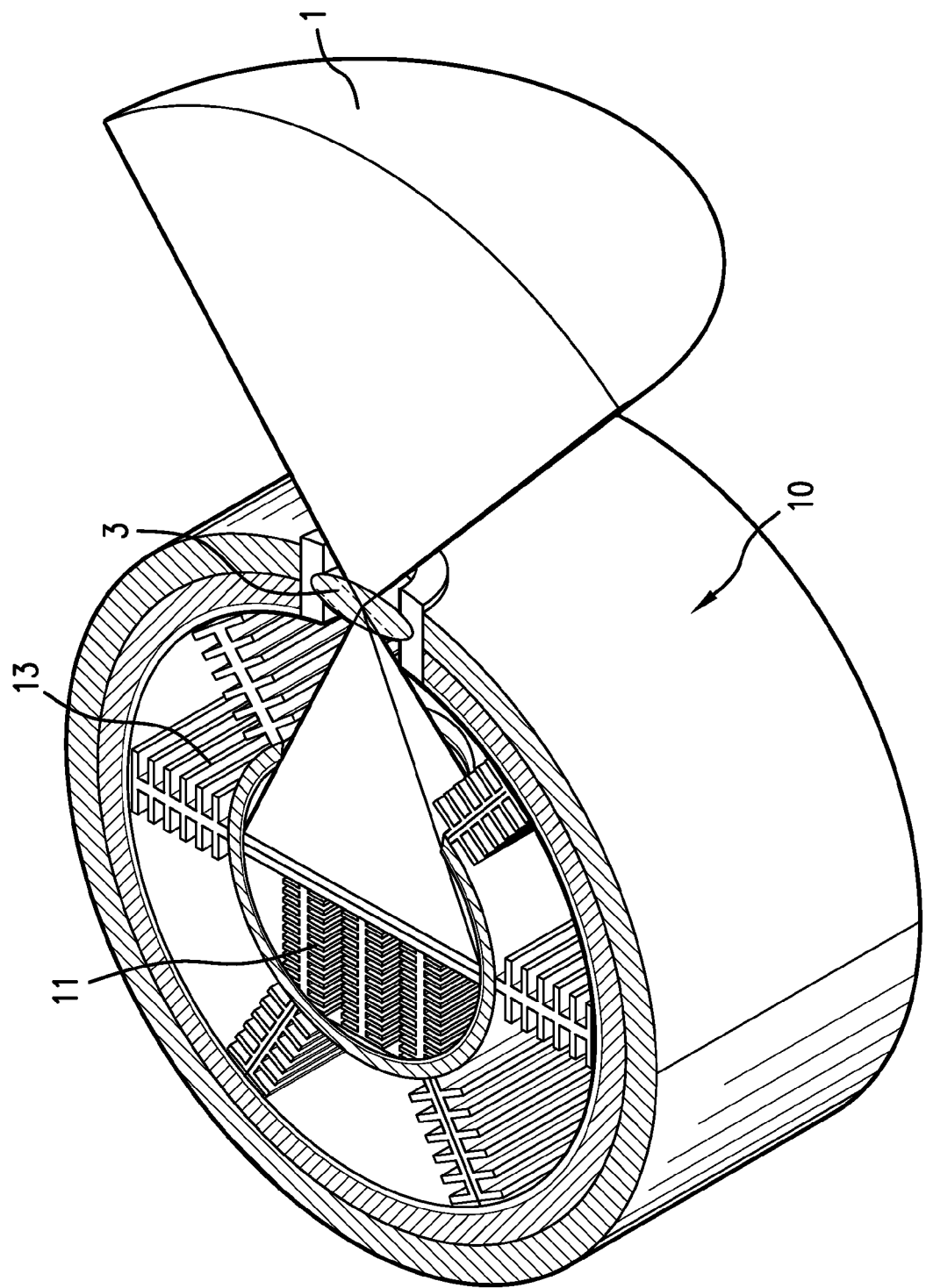
FIG. 3 provides yet another perspective view of the combined solar collector and heat exchanger of FIG. 1.
Figure 4A:
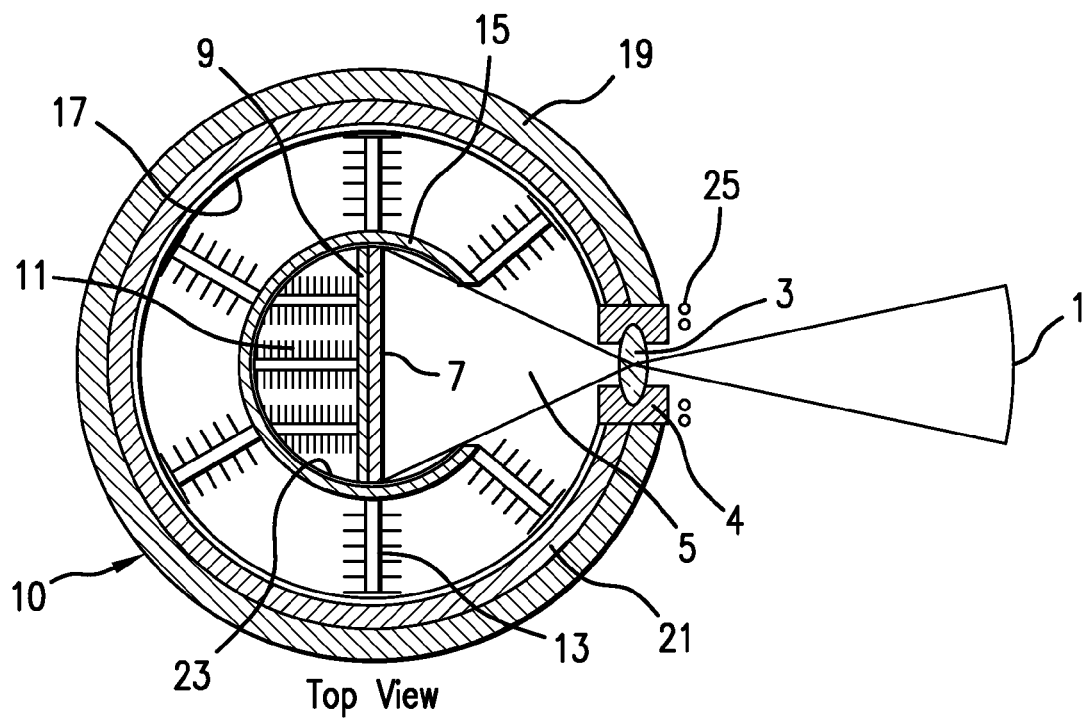
FIG. 4A provides a cross-sectional view, taken from the top, of the combined solar collector and heat exchanger of FIGS. 1-3.
Figure 4B:
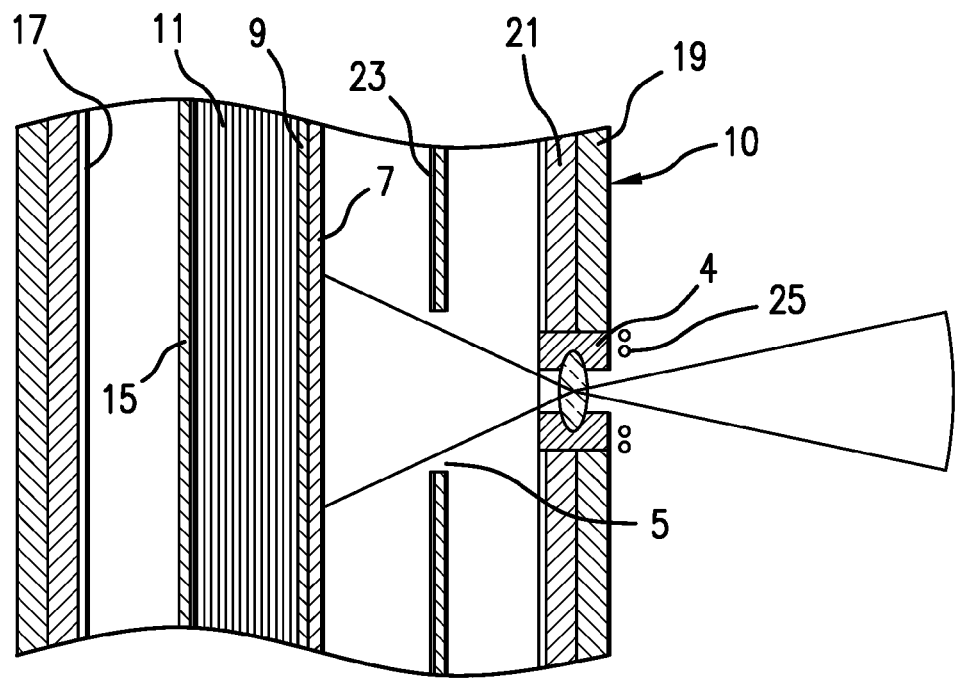
FIG. 4B provides a cross-sectional view, taken from the side, of the device of FIG. 4A.

FIGS. 1-3 and 4A-4B illustrate an embodiment of the present invention in which a solar collector and heat exchanger are provided as a single unit located inside a generally cylindrical chimney. The chimney comprises an enclosure for the solar collector and heat exchanger. Solar reflector 1, located outside chimney 10, concentrates sunlight into a high-intensity beam, which passes through lens 3. The lens, which is held by lens holder 4, serves as a means for allowing solar energy to enter the chimney. The lens refocuses the beam through aperture 5, located inside the chimney. The aperture could be made of the same material as that of the chimney, or it could be made of special heat-resistant material.

The focused solar radiation impinges on absorptive coating 7 disposed on target substrate 9. The absorptive coating comprises a material which facilitates the absorption of solar energy. The target substrate is in thermal contact with primary fins 11, and is in indirect thermal contact with secondary fins 13. The fins provide a heat exchange surface for heating convected air passing through the chimney. Energy transfer is effected between the hot surface of the solar thermal collectors and the surrounding air, due to the temperature differential.

Scattered incident solar radiation is absorbed by another absorptive coating 23 located on the inside surface of inner casing 15. Such heat absorption heats the inner casing, and thus also heats the secondary fins 13. Radiation emitted by the inner casing is reflected back onto the inner casing and secondary fins 13 by the reflective inner surface 17 of the outer casing 19 of the chimney. Insulation layer 21 prevents loss of heat due to conduction.

The device can also be provided with a fusible wire 25, disposed along the periphery of the aperture of the chimney, which would cause the reflectors to be switched off in the event of mis-focusing of the high-intensity beam, thus providing the chimney with a safety device comprising an emergency shut-off mechanism.

The solar energy collected within the chimney heats the air in the chimney, creating an updraft which can then be used to drive a turbine to produce electricity, or to perform other useful work.

Figure 5:
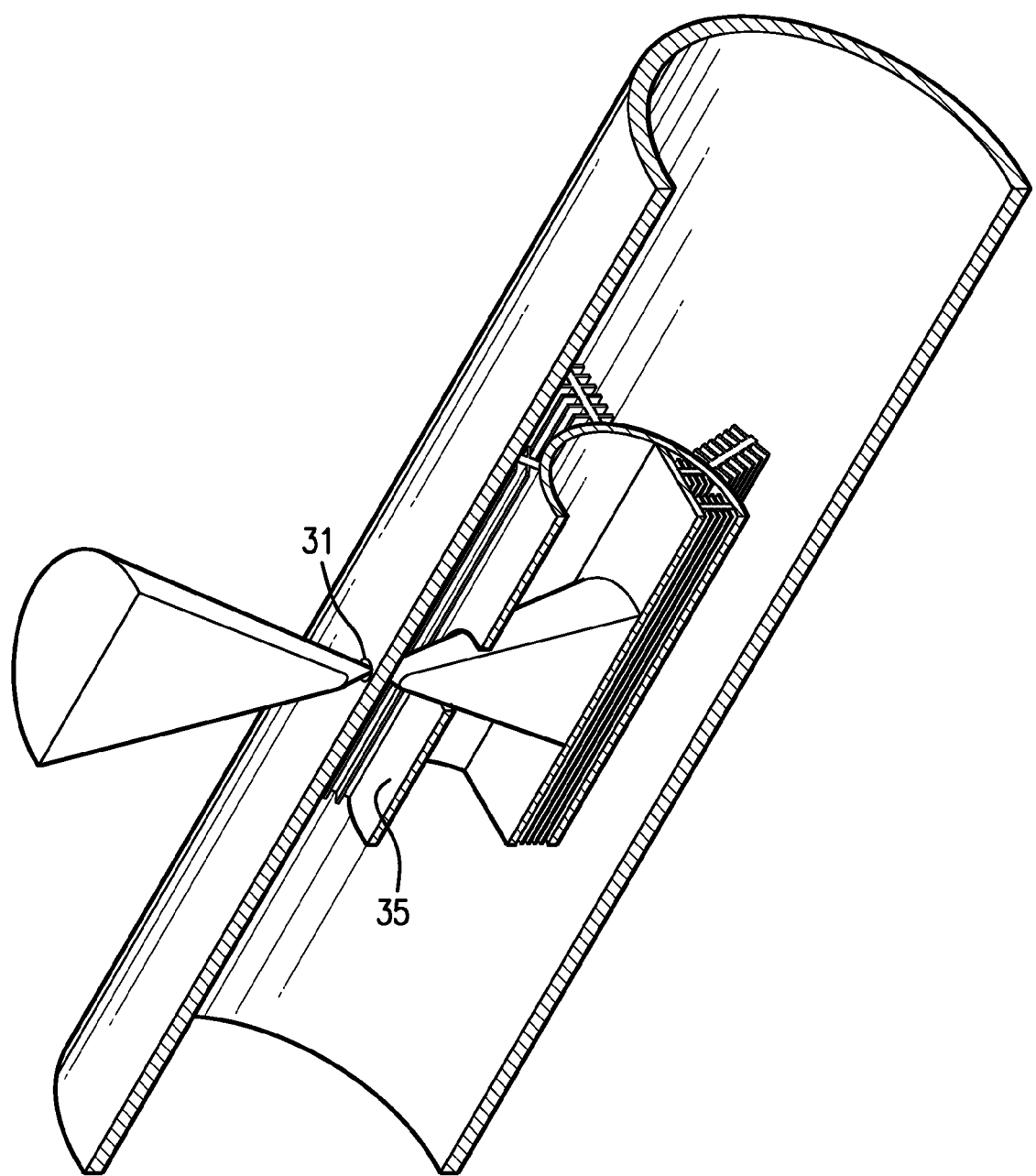
FIG. 5 provides a cut-away perspective view of a combined solar collector and heat exchanger, made according to the present invention, wherein solar energy enters the device through an aperture having no lens.
Figure 6A:
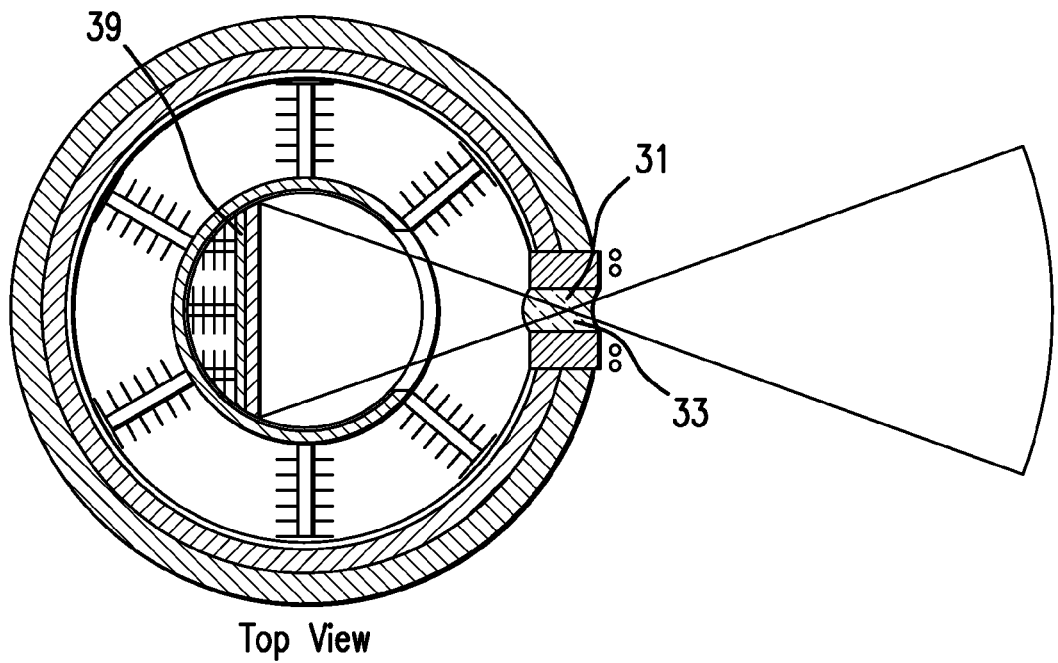
FIG. 6A provides a cross-sectional view, taken from the top, of the device shown in FIG. 5.
Figure 6B:
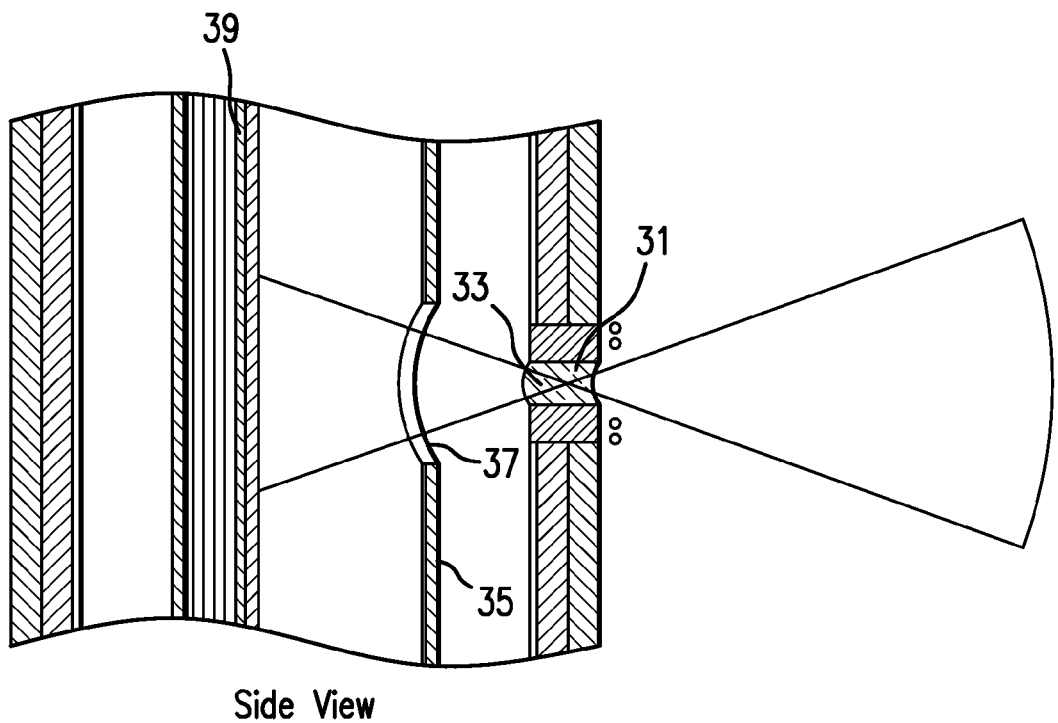
FIG. 6B provides a cross-sectional view, taken from the side, of the device shown in FIG. 5.

FIGS. 5, 6A and 6B illustrate another embodiment of the invention. This embodiment is similar to that of FIGS. 1-4, except that the solar beam is not focused by a lens. Instead, the solar radiation is simply directed through an aperture 31 formed in the wall of the chimney. The aperture may be fitted with a window 33, comprising a transparent or translucent material. The window thus allows solar energy to enter the chimney, while effectively sealing the enclosure by preventing air from entering. The inner casing 35 also has an aperture 37. The other components are similar to those of the embodiment of FIGS. 1-4, except that the target substrate 39 is displaced, compared to its position in the previous embodiment, due to the fact that the incoming beam is not focused by a lens.

Both the embodiment with a lens and the embodiment without a lens are useful, but the embodiment including the lens is considered preferable. A lens causes the incoming rays to diverge upon entering the chimney. The divergent rays then fall upon a larger area of the target substrate. The larger the area, the more energy the substrate can absorb, resulting in greater overall heating of the air in the chimney, and thus resulting in the production of more powerful updrafts. A lens also inherently prevents the intrusion of air into the chimney, so the lens thus serves both the purpose of focusing the rays and of keeping air out of the chimney. The only disadvantage is that the lens is more expensive than the simple window. In these embodiments, both the lens and the window comprise means for allowing solar radiation to enter the enclosure defined by the chimney.

Other means for directing solar energy into the chimney could be used instead of what is shown in the drawings. For example, sunlight could be directed into the chimney by a series of mirrors, a series of lenses, or light tubes, or some combination thereof.

Figure 7:
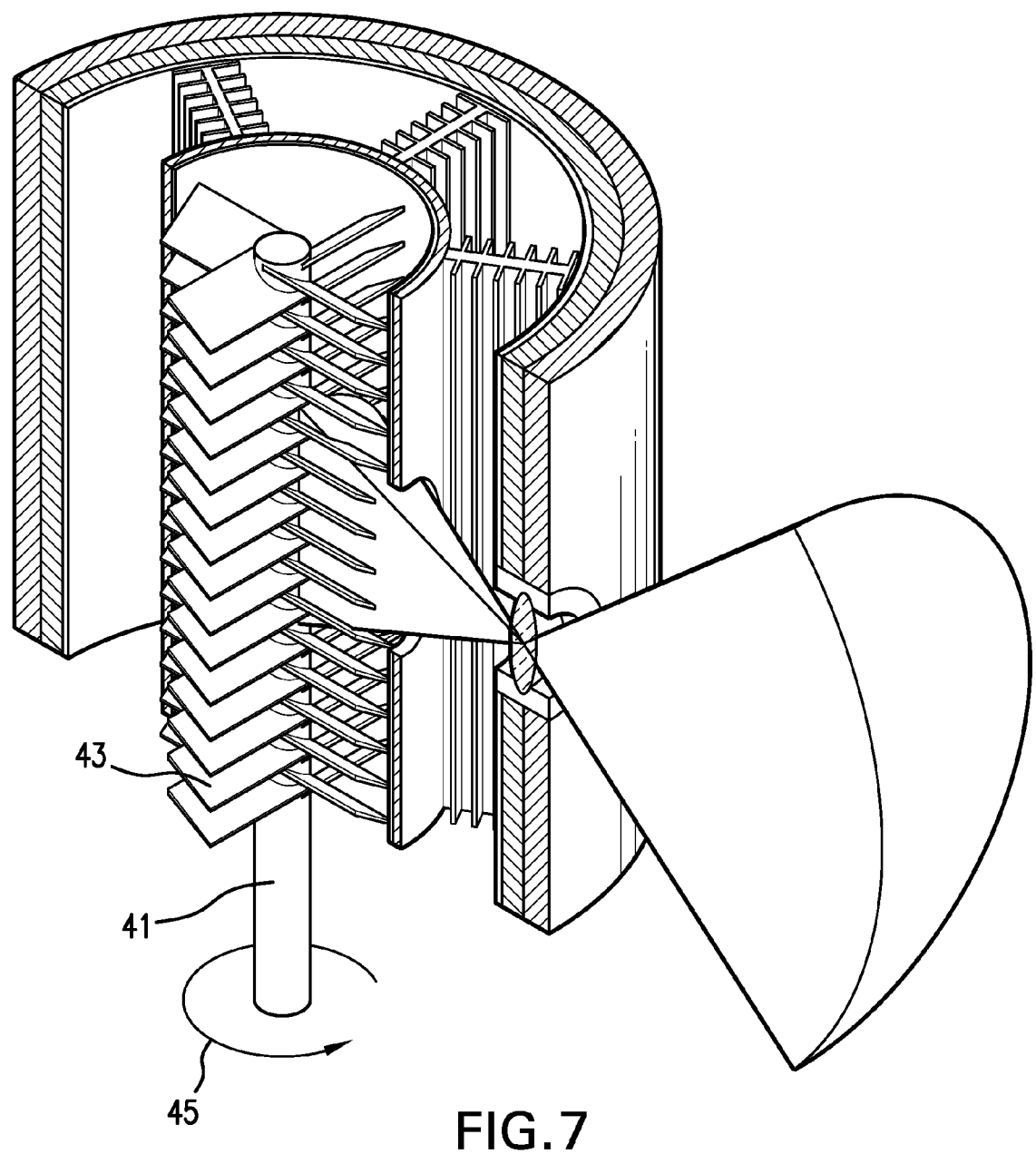
FIG. 7 provides a cut-away perspective view of another embodiment of the present invention, wherein the absorptive coating and target substrate rotate relative to the body of the combined solar collector and heat exchanger.
Figure 8A:
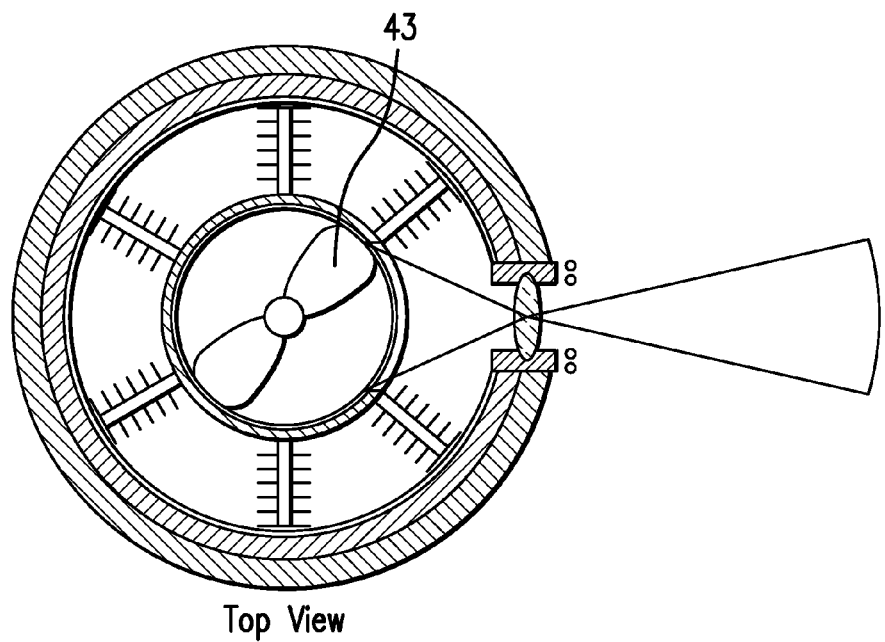
FIG. 8A provides a cross-sectional view, taken from the top, of the embodiment shown in FIG. 7.
Figure 8B:
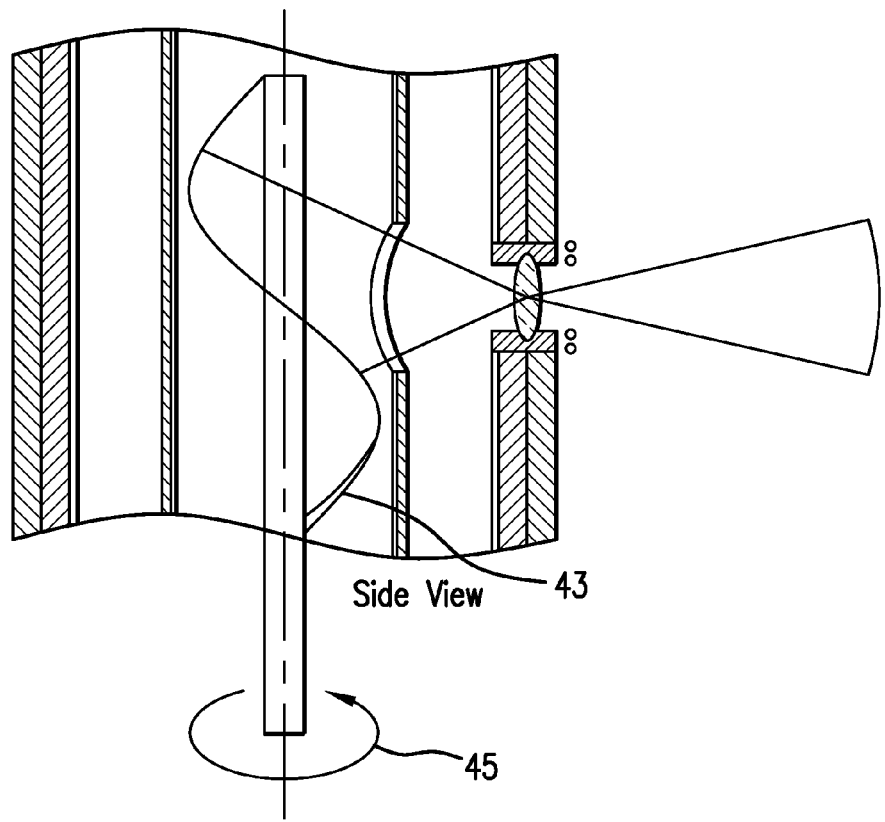
FIG. 8B provides a cross-sectional view, taken from the side, of the embodiment shown in FIG. 7.

Another embodiment of the invention is shown in FIGS. 7, 8A, and 8B. In this embodiment, the target substrate and its absorptive coating rotate relative to the fixed chimney. Vanes 43 define the target substrate, the target substrate having an absorptive coating (not explicitly shown). The vanes are mounted for rotation on shaft 41. The other components are similar to the embodiment of FIGS. 1-4. This embodiment could also be applied to the arrangement of FIGS. 5-6.

Rotation of the target substrate, in the embodiment of FIGS. 7-8, could be accomplished automatically, i.e. by allowing the structure to rotate freely under the influence of the updraft in the chimney. Alternatively, rotation could be caused by a motor. Arrow 45, which indicates the direction of rotation, is also intended to represent a motor for causing such rotation. The rotation of the vanes provides greater turbulence inside the chimney, resulting in higher heat flux to the convected air. The solar collector could also be provided with a combination of rotating and stationary elements.

Figure 9:
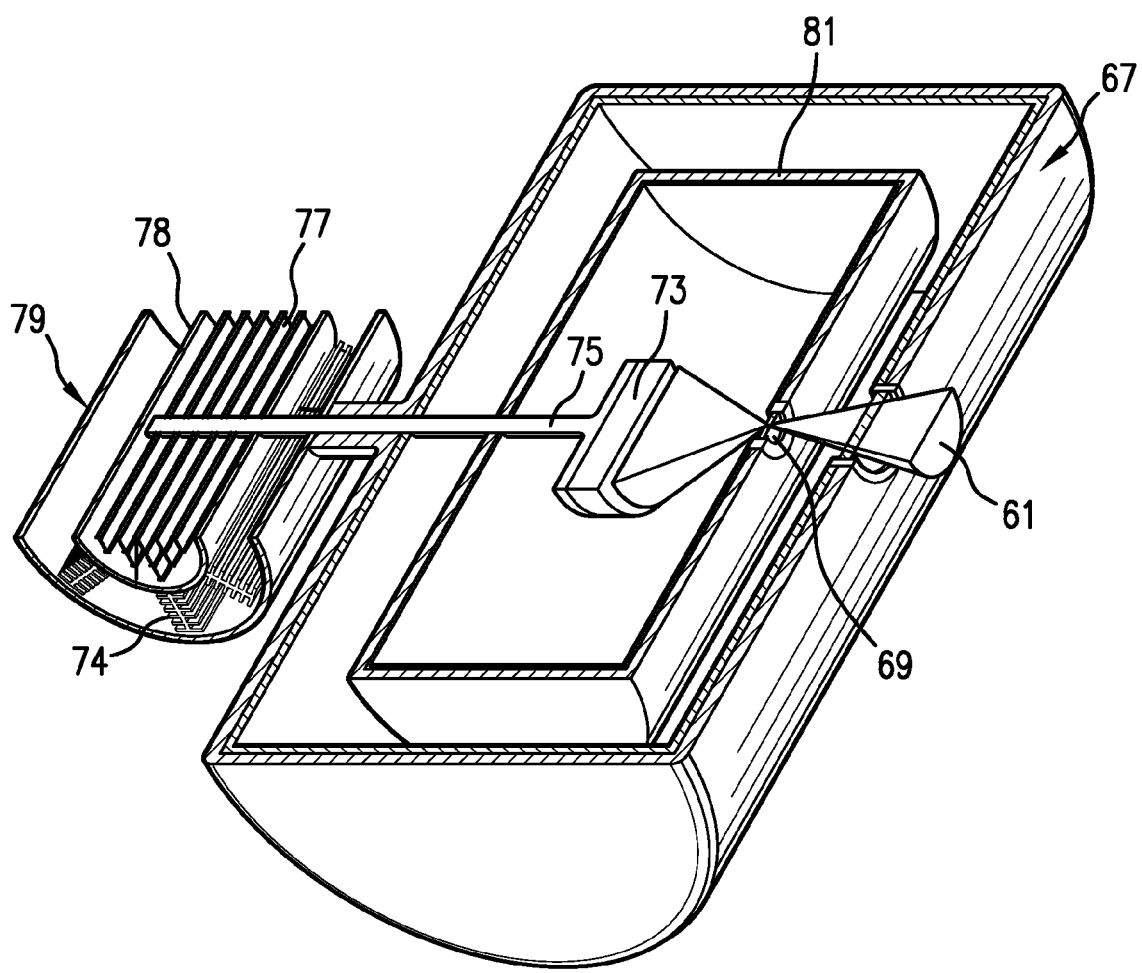
FIG. 9 provides a cut-away perspective view of another embodiment of the present invention, in which the solar collector is external to a chimney.
Figure 10A:
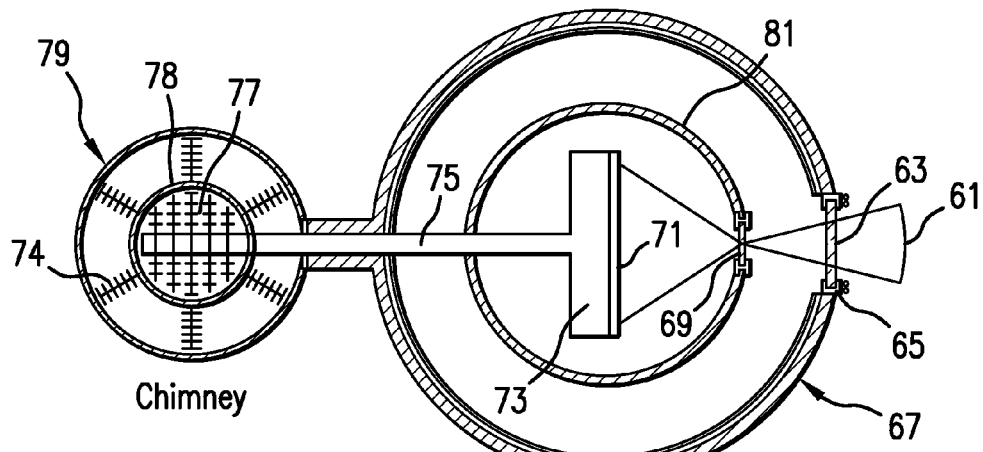
FIG. 10A provides a cross-sectional view, taken from the top, of the embodiment of FIG. 9.
Figure 10B:
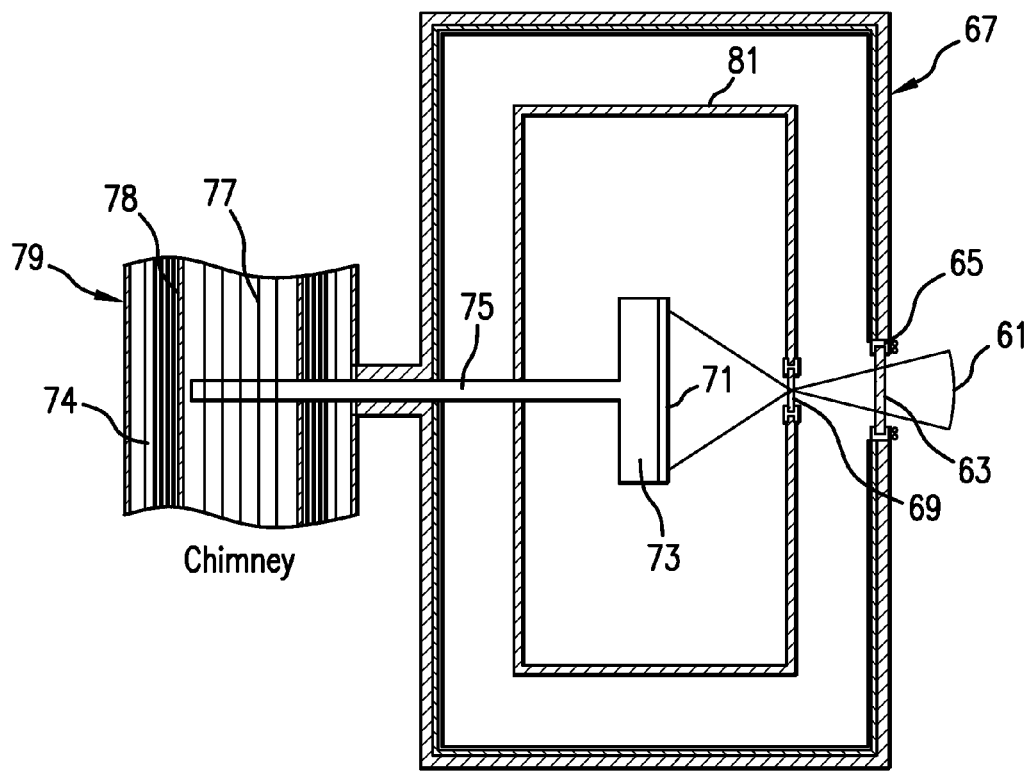
FIG. 10B provides a cross-sectional view, taken from the side, of the embodiment of FIG. 9.

FIGS. 9, 10A, and 10B show another embodiment of the invention, wherein the solar collector is external to the chimney. A solar reflector 61 directs a high-intensity solar beam through glass 63 held by window frame 65, formed in container 67. The container is a sealed enclosure, and may be metallic or non-metallic. The container is depicted as a cylinder, but it could have other shapes. The beam entering the container then passes through lens 69. The focused solar radiation impinges on absorptive coating 71 of target substrate 73. The target substrate conducts heat, through a solid heat conductor 75 to a heat exchanger 77 located within chimney 79. The heat exchanger 77 is surrounded by a reflective casing 78 which reflects radiation emitted by the heat exchanger. The reflective casing 78 is fitted with fins 74 to improve the heat transfer. Chimney 79 may be insulated.

The container 67 includes an inner casing 81 which preferably has an absorptive outer coating, for absorbing scattered incident solar radiation. The inner casing may also have a reflective inner surface that reflects scattered incident radiation back onto the absorptive coating 71 of target substrate 73. The outer casing of the container may also include a reflective inner surface, for reflecting emitted radiation back to the inner casing. The container is preferably evacuated and totally insulated to reduce or eliminate convective and conductive heat loss.

Solar energy directed onto the collector is thus converted into heat, in the collector, transferred to the chimney, and then used to heat the air in the chimney, forming the desired updraft for performing useful work.

Figure 11:
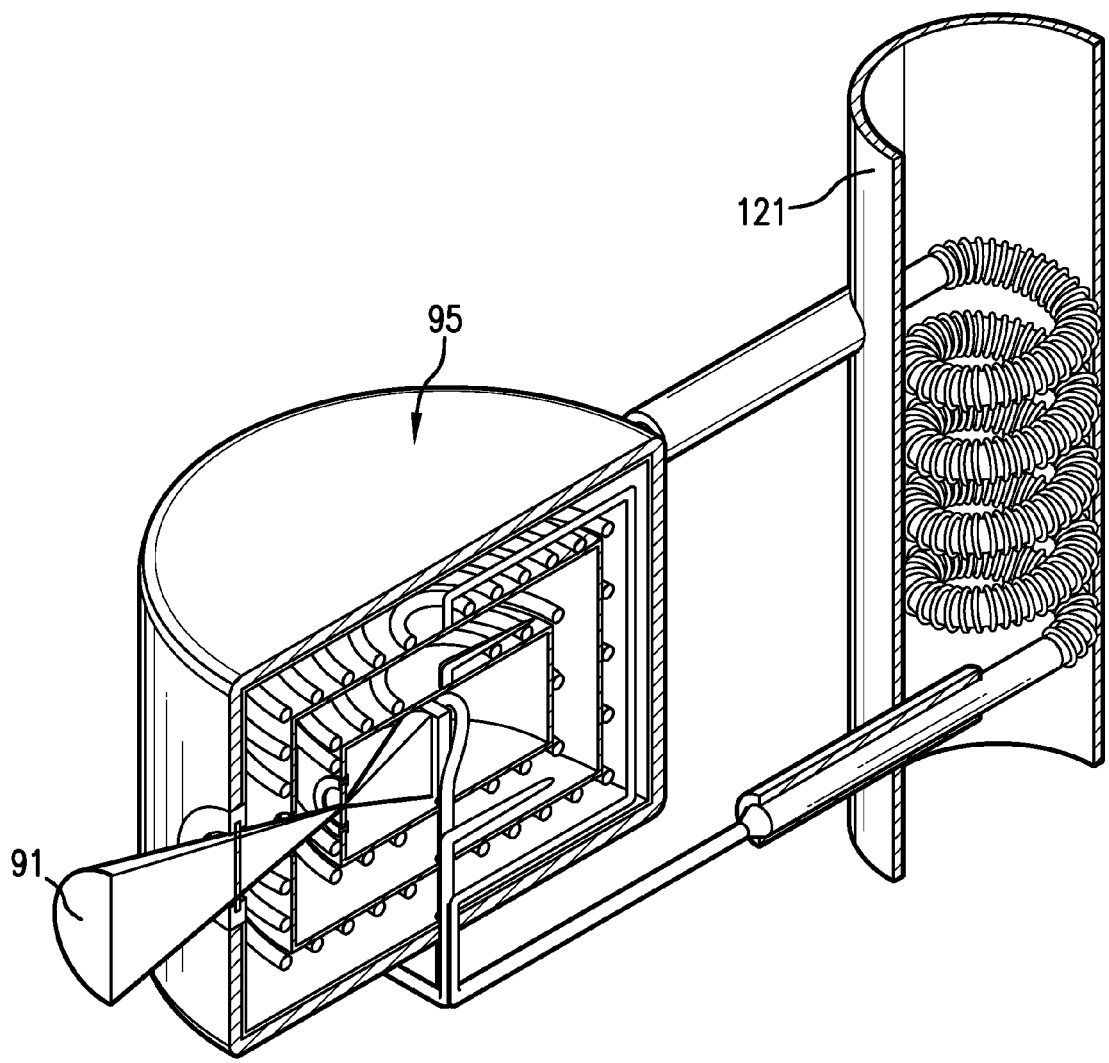
FIG. 11 provides a cut-away perspective view of another embodiment of the present invention, in which the solar collector is external to the chimney, and in which heat is exchanged through a heat transfer fluid.
Figure 12:
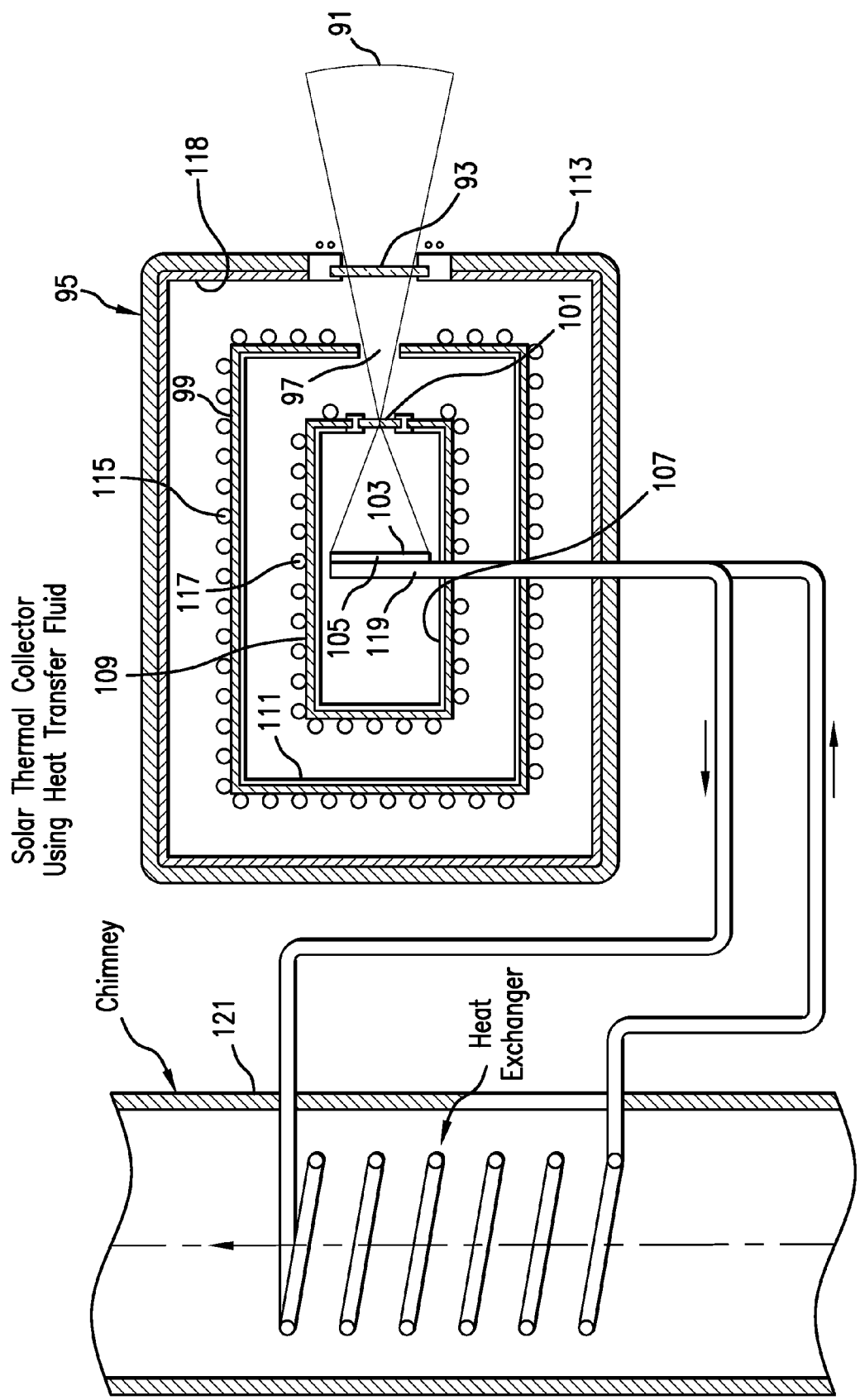
FIG. 12 provides a cross-sectional view of the embodiment of FIG. 11.
Figure 13A:
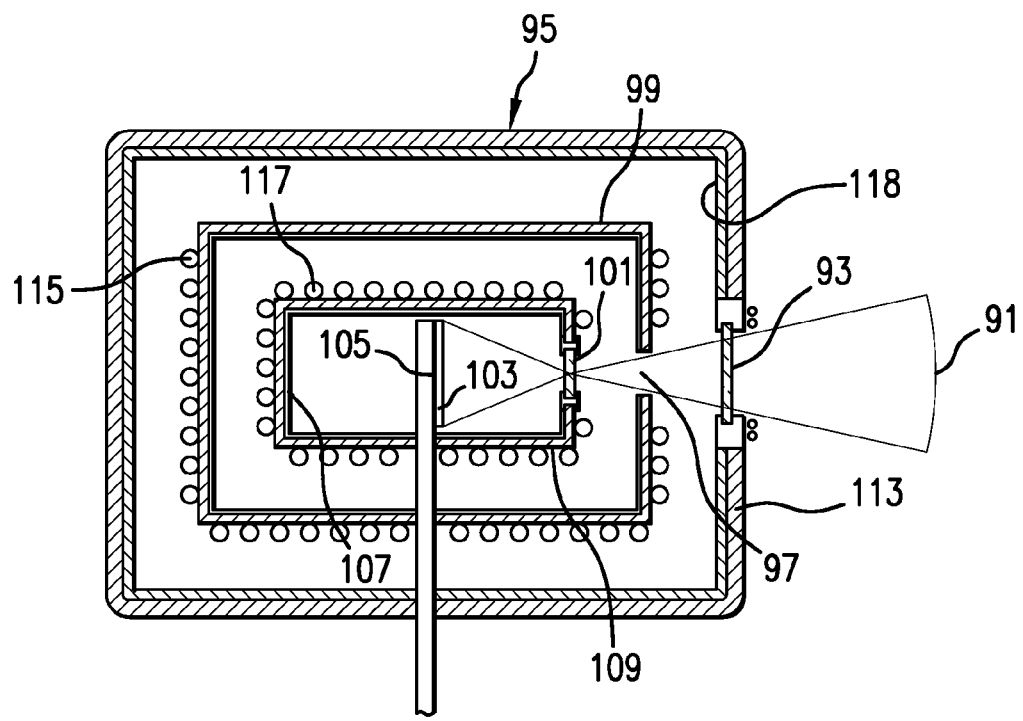
FIG. 13A provides a cross-sectional view, taken from the side, of the solar collector portion of the embodiment of FIG. 11.
Figure 13B:
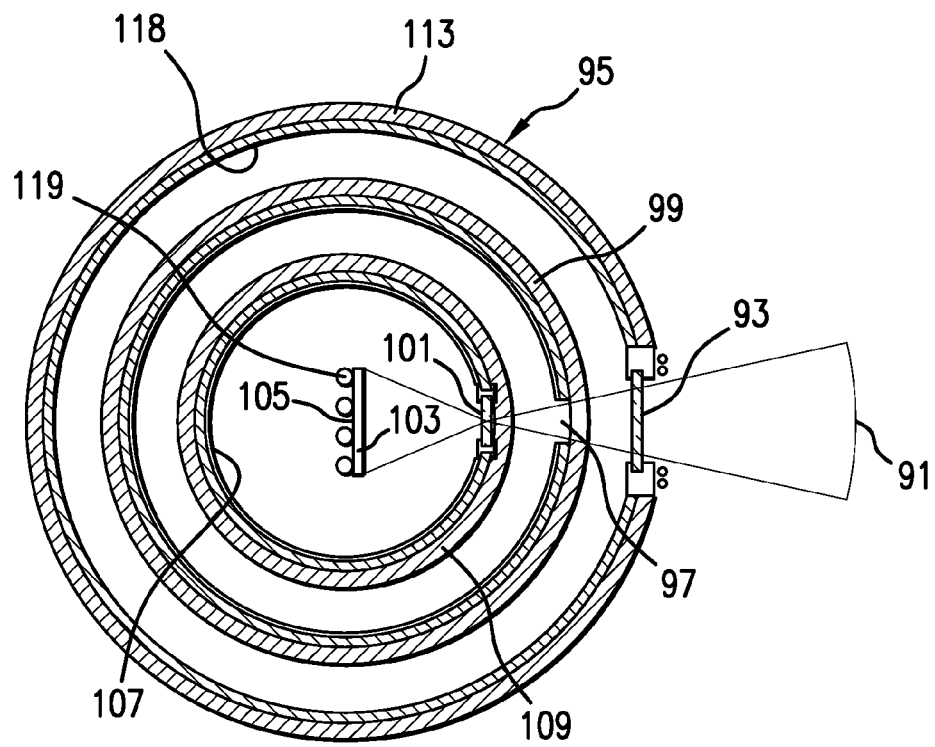
FIG. 13B provides a cross-sectional view, taken from the top, of the solar collector portion of the embodiment of FIG. 11.

FIGS. 11-13 illustrate another embodiment of the invention, wherein the solar collector is again external to the chimney, and wherein heat from the solar collector is transferred through a heat transfer fluid. In this embodiment, reflector 91 directs a high-intensity beam of solar radiation through window 93 of container 95. The container is preferably sealed and evacuated. The beam passes through aperture 97 in intermediate casing 99. The beam is then refocused by lens 101 onto absorptive coating 103 of target substrate 105. The target substrate is thereby heated.

Scattered incident solar radiation is absorbed by absorptive coating 107 of inner casing 109, thereby heating the inner casing. Emitted radiation is absorbed by absorptive coating 111 disposed on the inside surface of intermediate casing 99. The outer casing 113 has a reflective inner surface 118 which reflects radiation emitted by the intermediate casing 99 back onto the intermediate casing. Heat transfer fluid coils 115, 117, and 119 are attached to intermediate casing 99, inner casing 109, and target substrate 105, respectively. Heat transfer fluid enters the container, first conveying thermal energy away from intermediate casing 99, then from inner casing 109, and finally from target substrate 105. The heat transfer fluid coils are in fluid connection with the same fluid conduit which conveys the fluid between the solar collector and the heat exchanger in the chimney. As the heat transfer fluid carries the heat, it becomes progressively hotter, and leaves the collector at its highest temperature before transferring thermal energy to ambient air at the heat exchanger within chimney 121.

The heat transfer fluid may be circulated by a pump (not shown), or by a passive means, such as a thermosiphon, wherein liquid circulates in a vertical closed-loop system, without a pump, due to natural convection.

As in the previous embodiments, the thermal collectors can be either metallic or non-metallic. They are preferably evacuated and totally insulated to reduce or eliminate convective and conductive heat loss.

Figure 14:
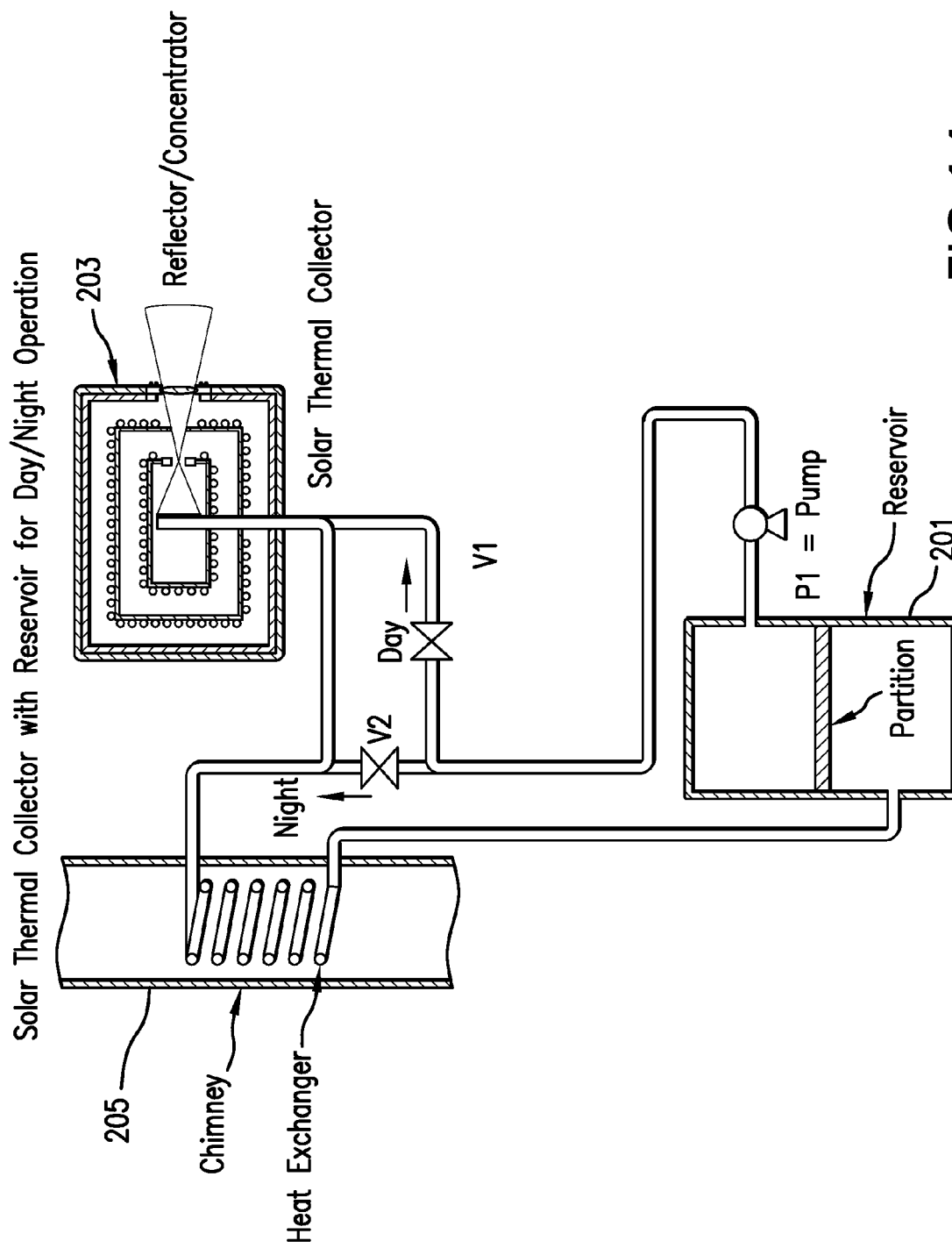
FIG. 14 provides a schematic diagram of another embodiment of the present invention, this embodiment including a reservoir for storing heated fluid, for day/night operation.

FIG. 14 illustrates an embodiment of the invention suitable for use in both daytime and nighttime operation. FIG. 14 illustrates the general operation; specifics are shown in FIGS. 15A-C. In brief, during the daytime, heat transfer fluid is pumped, by pump P1, from reservoir 201, through valve V1, and into external solar collector 203. The heat transfer fluid receives heat in the solar collector, and then flows out of the collector and into a heat exchanger located inside chimney 205. The heat transfer fluid gives up heat, in the chimney, to the air surrounding the heat exchanger, and then flows back to the reservoir. During the nighttime, valve V1 is closed and valve V2 is opened, causing stored heated fluid from the reservoir to flow directly into the chimney, where heat from the fluid is transferred to surrounding air in the same manner. The fluid then returns to the reservoir.

Thus, the valves, conduits, and pump together comprise means for directing heat transfer fluid between the reservoir, the solar collector, and the heat exchanger in the chimney.

FIGS. 15A-C illustrate the operation of the arrangement of FIG. 14 in more detail. Consider first the operation during the day, illustrated in FIG. 15A. In this case, valve V1 is open, valve V2 is closed, and valve V3, the outlet valve of the reservoir, is open.

Heat transfer fluid is heated by absorption of solar radiation in collector 301. The heated fluid releases the absorbed energy in chimney 303, which is assumed to include a heat exchanger, as described above. The energy released in the chimney is a function of the temperature differential between the heated fluid and ATD, the air temperature during daytime. After passing through the chimney, the fluid has temperature LTD, which is defined as the fluid temperature after heat exchange with daytime air. The temperature LTD is still high enough to transfer residual energy to cooler nighttime air, the temperature of the nighttime air being designated as ATN. In other words, nighttime air can be heated by the fluid that has already been used to heat daytime air, enabling the chimney to generate power during the night.

It is crucial that the fluids of different temperatures, enabling this operation, be prevented from mixing. Partition 305 acts both as a physical and thermal barrier.

FIG. 15A represents the status of the reservoir at the start of the day. The upper portion of the reservoir holds heat transfer fluid having a temperature LTN, which indicates the temperature of the fluid after heat exchange with nighttime air. This fluid is withdrawn from the reservoir, through valves V3 and V1, and conveyed to collector 301, where it is heated. The fluid then flows to chimney 303, where it releases part of its absorbed energy. The hot fluid heats the air in the chimney having temperature ATD, creating an updraft in the chimney, the updraft being sufficiently powerful to perform useful work.

The system described is a closed system, so as the fluid (at temperature LTN) is withdrawn from the upper portion of the reservoir, an equal amount of heat transfer fluid, having temperature LTD, is simultaneously filling the bottom portion of the reservoir. Such fluid accumulates in the lower portion of the reservoir, throughout the day. The partition 305 adjusts itself automatically, being pulled up by the diminishing volume of fluid in the upper portion, and being pushed up by the increasing volume of fluid in the lower portion. Expansion bellow 307 provides pressure relief as the partition moves upward.

As the day progresses, partition 305 moves upward within the reservoir. When the day ends, the barrier will be at or near the top of the reservoir, as shown in FIG. 15B. At this point, the reservoir is largely filled with fluid which has released its heat to daytime air, and which has temperature LTD. It is now time to change over to nighttime operation.

The partition 305 must be moved down to prevent the incoming heat transfer fluid, which will have released heat to nighttime air and which will have temperature LTN, from mixing with the hotter fluid which has released heat to daytime air (LTD). The change over is accomplished by opening valve VR, which temporarily renders the partition ineffective. The partition can then be lowered to the bottom of the reservoir, either by adjusting its density to make it heavier, or by mechanical means. After the partition has been lowered, valve VR is again shut, restoring the physical and thermal barrier between fluids of different temperature. Valve V1 is then shut, and valve V2 is opened, so that fluid from the reservoir can flow directly to the chimney 303, bypassing the solar collector 301. The solar collector is, of course, unnecessary and useless at night.

The opening of the valve VR causes the fluid in the reservoir to become fluid having temperature at or near LTD. This fluid will flow into chimney 303, and can release its residual energy to the cooler nighttime air, having temperature ATN, to generate power. By dawn, the fluid in the bottom portion of the reservoir will be fluid having temperature LTN, i.e. fluid which has released heat to nighttime air. That is why the upper and lower portions of the reservoir are designated by LTN and LTD, respectively, in FIGS. 15A and 15B, but are designated by LTD and LTN, respectively, in FIG. 15C.

At dawn, the fluid having temperature LTN will have replaced the fluid of temperature LTD, in the lower portion of the reservoir. The valve VR is then opened to lower the partition again. Valve V1 is then opened, and valve V2 is closed, so that the daytime process can begin again.

The reservoir could be provided with multiple partitions and/or multiple inlet and outlet valves. The use of multiple partitions enables more differentiation among fluids of different temperatures, resulting in greater efficiency and more constant energy output produced by the updrafts formed in the chimney. Thus, the present invention uses a reservoir having two or more compartments, the compartments being defined by the partitions.

FIGS. 15A-C thus show how fluids of different temperatures can be kept separated to prevent mixing. The process requires that mixing be prevented. Switching of the operation of the system is effected simply by opening the valve VR. The process begins again when valve VR is closed.

Figure 16:
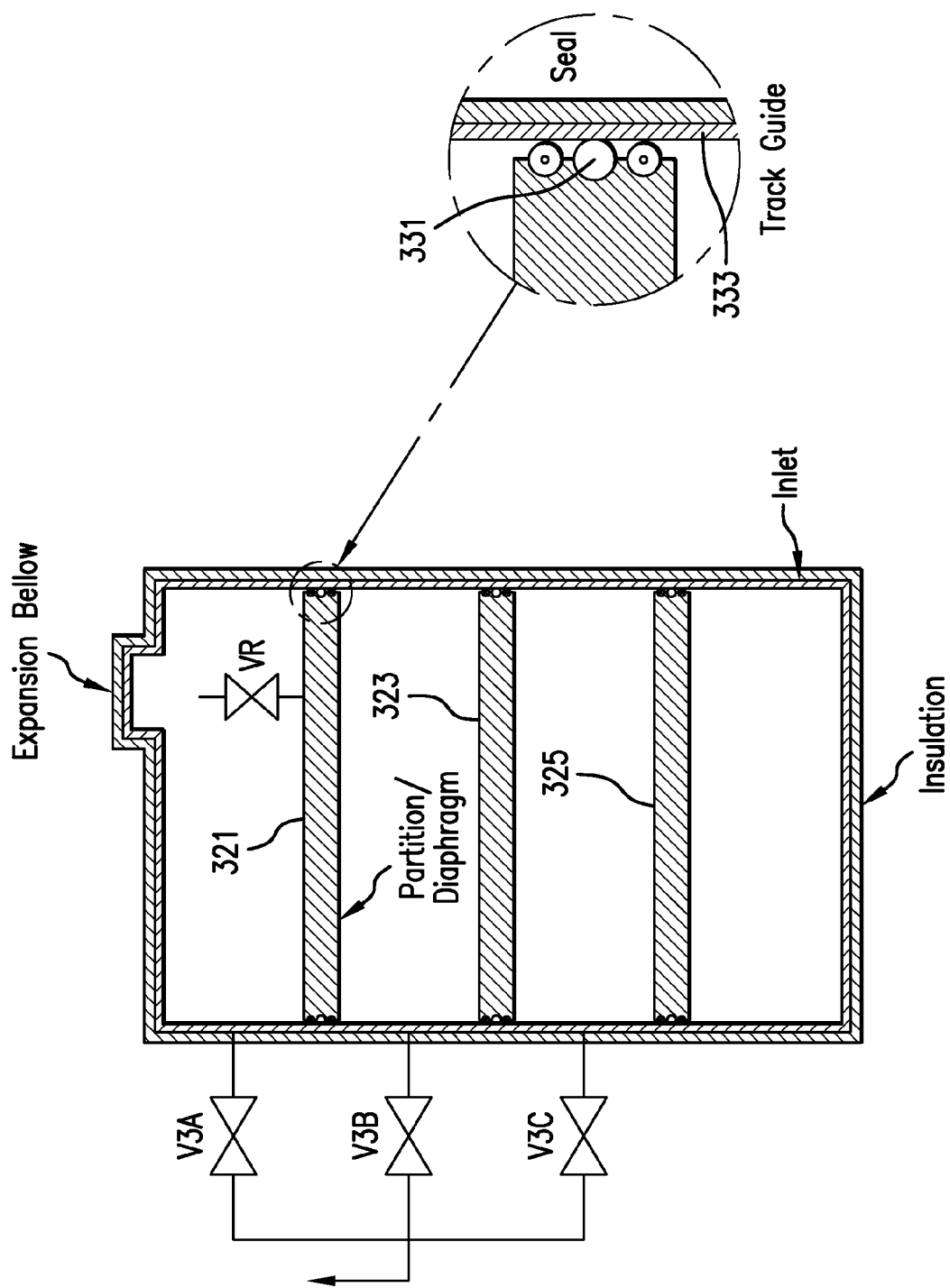
FIG. 16 provides a partly schematic, and partly cross-sectional diagram showing details of the reservoir used in the embodiment of FIG. 14.

FIG. 16 provides further details of the reservoir represented in FIGS. 14 and 15A-C. This figure also illustrates the case in which there may be multiple partitions and multiple outlet valves. In FIG. 16, there are shown partitions 321, 323, and 325. Disposed between the levels of these partitions are valves V3A, V3B, and V3C, the latter valves corresponding to outlet valve V3 shown in FIGS. 15A-C. FIG. 16 also shows, in a detailed view, the movement of the partitions relative to the wall of the reservoir. As shown in the figure, the partition can be mounted to rollers 331 which move within track guide 333.

The reservoir can be metallic or non-metallic, and can be disposed horizontally or vertically. The reservoir could be uninsulated, although it is preferred to provide insulation. The reservoir could be located either above ground or below ground. The expansion bellow accommodates thermal expansion of the heat transfer fluid stored therein. The reservoir is totally enclosed, forming a closed-loop system with the solar thermal collector.

The partition or partitions are thermally insulated. The locations where the partition meets the wall of the reservoir constitutes a seal, creating both a physical and a thermal barrier to fluid on either side of the partition. The partition can thus move according to the change in volume of the fluid contained within the space bounded by the partition.

The sealing between the reservoir wall and the partition is provided by a mechanical seal or an elastomer. The partition is preferably equipped with a mechanism, which could be mechanical, electrical, or physical, that can move the partition to a desired position.

Figure 17:
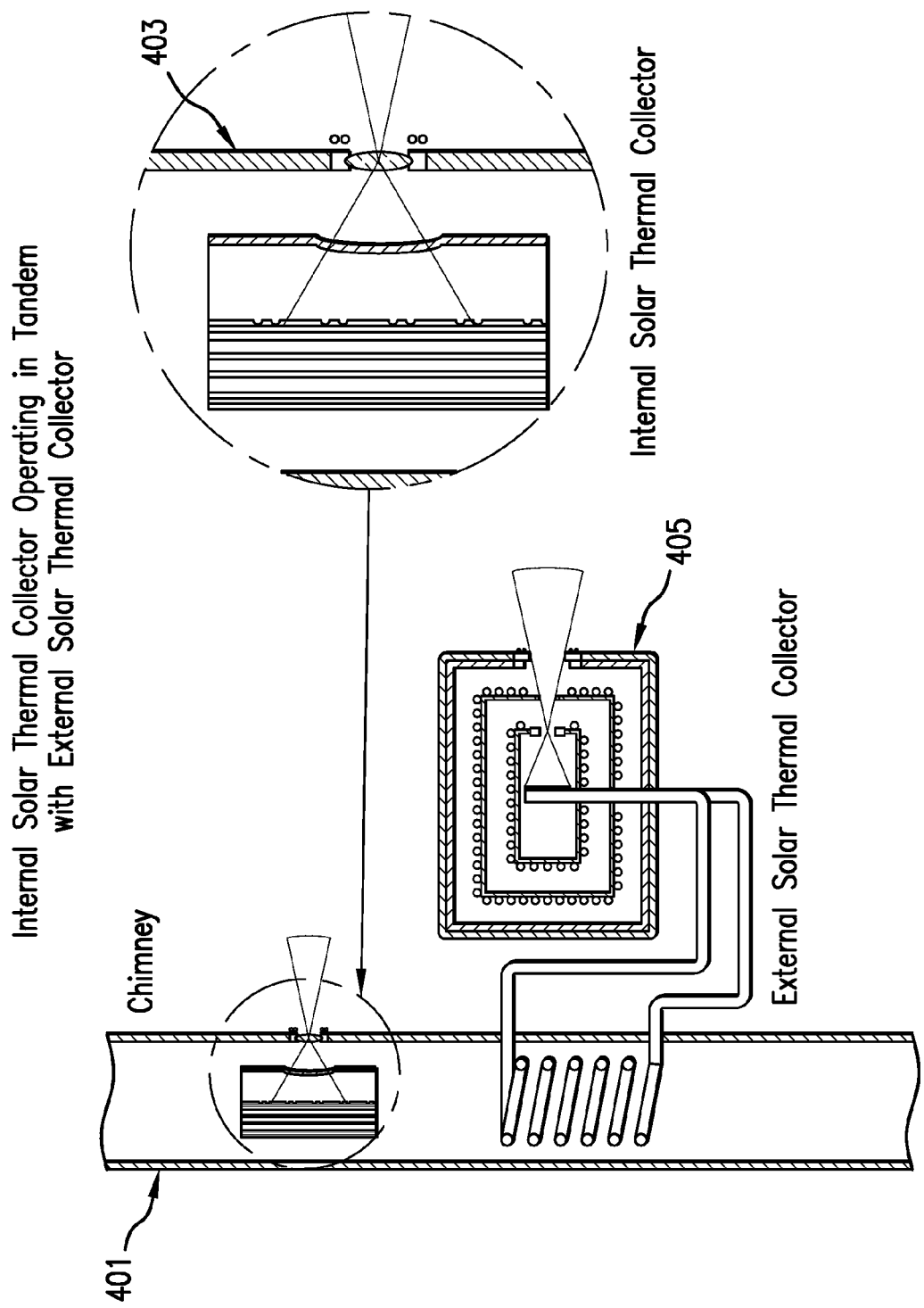
FIG. 17 provides a schematic diagram of another embodiment of the present invention, in which internal and external solar thermal collectors operate in tandem or individually.

FIG. 17 shows another embodiment of the present invention, in which the system includes both an internal and an external solar collector. As indicated in the figure, chimney 401 includes internal solar collector 403 and external solar collector 405. Thus, the figure shows a combined solar collector and heat exchanger, located entirely within the chimney, and a heat exchanger, spaced apart from the combined solar collector and heat exchanger, used in connection with the external solar collector. These solar collectors can be constructed as described in the previous embodiments.

With regard to the external solar collector, FIG. 17 shows the heat being transferred by a heat transfer fluid, but it is understood that this embodiment could include the use of a solid heat transfer device, as described earlier.

The solar collectors thus work in tandem, both generating heat within the chimney, and thereby producing updrafts which can perform useful work. The use of some or all of the features of the previous embodiments, working in tandem, increases the output of the solar chimney. A reservoir could also be added to the arrangement of FIG. 17, in the same manner described in previous embodiments, so that power can be generated both during the day and during the night.

Figure 18:
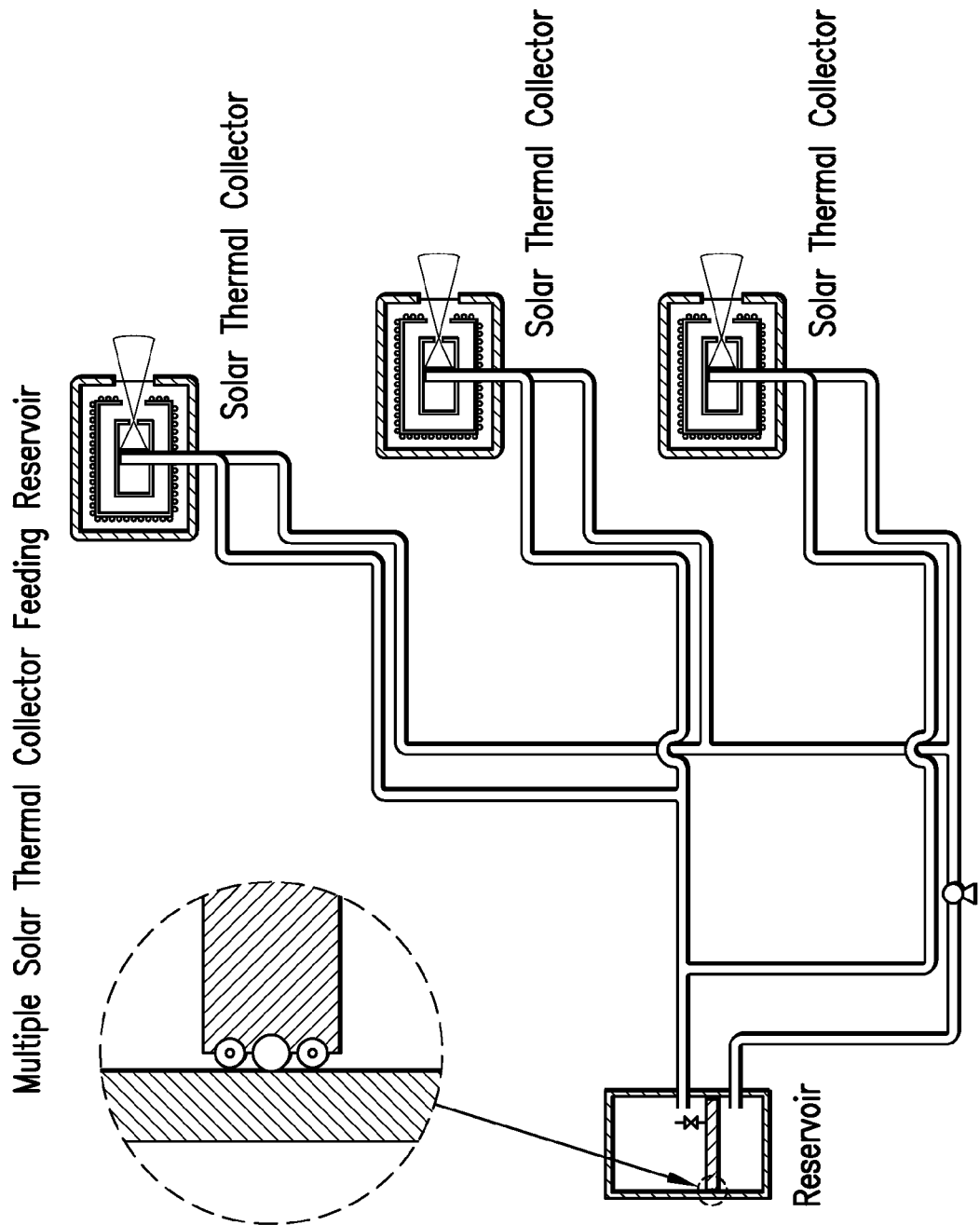
FIG. 18 provides a schematic diagram of another embodiment of the present invention, wherein multiple solar collectors are used, in parallel, to feed a reservoir.

FIG. 18 shows another embodiment of the invention. In this embodiment, there are multiple solar collectors, connected in parallel, to feed a reservoir. The reservoir is constructed in the same manner described earlier. FIG. 18 shows that the reservoir can be supplied by one or more solar collectors. For simplicity of illustration, the connection(s) between the reservoir and a heat exchanger located within the chimney are not shown, but it is understood that FIG. 18 comprises a modification of the embodiment shown in FIGS. 14-16. The use of multiple solar collectors increases the security and flexibility of the system. The system could be expanded by adding one solar collector at a time, without disrupting the operation of the system. Also, the use of multiple solar collectors connected in parallel makes it practical to disconnect one collector for repair, without halting operation of the overall system.

The construction of the solar chimney is designed to minimize heat loss. The solar chimney can be made of brick, concrete, fiberglass, steel, or other materials, or combinations of the above, consistent with the requirements of maximum economy, high strength, low heat loss, and efficient air flow. The chimney can be constructed of pipes made of fiberglass, which could be single-walled or multi-walled, and which could be made with or without stiffeners such as a honeycomb, and with or without insulation. The pipes can be lined or unlined, and could be of the same or different materials, consistent with the required temperatures of operation.

It should be understood that features described with respect to a particular embodiment are often applicable to other embodiments. For example, the rotatable vanes of the heat exchanger can be provided both in the case where the solar collector is located within the chimney, and in the case where the solar collector is outside the chimney. The solar collectors of both embodiments could be provided with either a lens, a window, or an aperture for allowing solar radiation to enter. In the case where the solar collector is inside the chimney, the lens or window or aperture would be located in the chimney wall. In the case where the collector is outside the chimney, the lens or window or aperture would be located in a housing for such collector.

Similarly, in cases in which an external solar collector is used, without a reservoir, the means of heat transfer between the solar collector and the heat exchanger inside the chimney could be either a solid heat conductor or a heat transfer fluid. For embodiments with a reservoir, it is necessary that the heat transfer medium be a fluid.

In the embodiment of FIG. 17, the external solar collector could transfer heat to the inside of the chimney by a solid heat conductor, as shown in FIG. 9, instead of the heat transfer fluid as suggested in FIG. 17.

Although a reservoir is not shown in FIG. 17, a reservoir could be used with any or all of the external solar collectors used in that embodiment, in the same manner disclosed in FIGS. 14-16.

Thus, the appearance of a particular feature in a particular embodiment should not be interpreted to limit the use of such feature to that embodiment. On the contrary, the disclosed features may, when logical and appropriate, be combined in many different ways.

The reader skilled in the art will recognize other variations of the invention. Such variations should be considered within the spirit and scope of the following claims.

What is claimed is:

1. Apparatus for collection and use of solar energy, comprising:
   a) a generally cylindrical chimney, the chimney providing a path for flow of air by convection so as to perform useful work,
   b) an external solar collector, the external solar collector including:
      i) a generally cylindrical outer casing having a first aperture for allowing solar radiation to enter the outer casing,
      ii) a generally cylindrical inner casing, disposed within the outer casing, the inner casing having a second aperture for allowing solar radiation, having passed through the first aperture, to enter the inner casing,
      iii) a first target substrate, located within the inner casing, for absorbing solar radiation in the inner casing,
   wherein the chimney is spaced apart from the external solar collector, wherein the chimney includes a first heat exchanger located inside the chimney for heating air within the chimney,
   the apparatus including means for transferring heat between the first target substrate within the external solar collector and the first heat exchanger inside the chimney, and
   c) an internal solar collector located entirely inside the chimney, the internal solar collector including a second target substrate which is connected to a second heat exchanger, the chimney having an opening which allows solar radiation to impinge upon the second target substrate.

2. The apparatus of claim 1, wherein the heat transferring means comprises a solid material connecting the first target substrate and the first heat exchanger.

3. The apparatus of claim 1, wherein the heat transferring means comprises a conduit for conveying a heat transfer fluid between the first target substrate and the first heat exchanger.

4. The apparatus of claim 1, wherein the first heat exchanger includes a plurality of vanes which are mounted for rotation within the chimney.

5. The apparatus of claim 1, wherein there is an intermediate casing surrounding the inner casing and located within the outer casing.

6. The apparatus of claim 5, wherein the inner casing has a heat absorptive inner surface, wherein the intermediate casing has a heat absorptive inner surface, and wherein the outer casing has a reflective inner surface.

* * * * *